(12) United States Patent
Liu

(10) Patent No.: US 8,623,258 B2
(45) Date of Patent: *Jan. 7, 2014

(54) METHOD FOR MAKING CARBON NANOTUBE FILM

(75) Inventor: Liang Liu, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 354 days.

This patent is subject to a terminal disclaimer.

(21) Appl. No.: 12/952,396

(22) Filed: Nov. 23, 2010

(65) Prior Publication Data

US 2011/0241244 A1    Oct. 6, 2011

(30) Foreign Application Priority Data

Apr. 2, 2010  (CN) .......................... 2010 1 0138327

(51) Int. Cl.
*B29C 33/58*    (2006.01)

(52) U.S. Cl.
USPC ........... 264/316; 264/164; 264/165; 264/212; 264/313; 264/337; 264/338; 264/482; 264/496; 977/842; 423/447.3

(58) Field of Classification Search
USPC ......... 264/164, 165, 212, 337, 338, 482, 496, 264/313, 316; 977/842; 423/447.3
See application file for complete search history.

(56) References Cited

U.S. PATENT DOCUMENTS

| 7,288,321 | B2 | 10/2007 | Liu et al. | |
| 7,641,885 | B2 | 1/2010 | Liu et al. | |
| 2007/0148530 | A1 | 6/2007 | Lin et al. | |
| 2008/0299031 | A1* | 12/2008 | Liu et al. | .................... 423/447.3 |
| 2009/0075545 | A1* | 3/2009 | Lashmore et al. | ............ 442/329 |
| 2009/0297732 | A1 | 12/2009 | Jiang et al. | |
| 2011/0233816 | A1* | 9/2011 | Liu | ............................... 264/164 |

FOREIGN PATENT DOCUMENTS

| CN | 1502553 | 6/2004 |
| CN | 101591015 | 12/2009 |
| JP | 2005-60131 | 3/2005 |
| JP | 2007-169155 | 7/2007 |

* cited by examiner

*Primary Examiner* — Milton I Cano
*Assistant Examiner* — Jeremiah Smith
(74) *Attorney, Agent, or Firm* — Altis Law Group, Inc.

(57) ABSTRACT

The present disclosure relates to a method for making a carbon nanotube film. In the method, a bent flexible substrate having a curved surface and a pressing device are provided. A carbon nanotube array is formed on the curved surface. The bent flexible substrate is at least partially unbent, thereby at least partially unbending the carbon nanotube array. The unbent carbon nanotube array is pressed by the pressing device to slant the carbon nanotubes in the unbent carbon nanotube array, thereby forming the carbon nanotube film.

20 Claims, 3 Drawing Sheets

METHOD FOR MAKING CARBON NANOTUBE FILM

CROSS-REFERENCE TO RELATED APPLICATIONS

This application claims all benefits accruing under 35 U.S.c §119 from China Patent Application No. 201010138327.7, filed on Apr. 2, 2010, in the China Intellectual Property Office, the disclosure of which is incorporated herein by reference. This application is related to commonly-assigned applications entitled, "METHOD FOR MAKING CARBON NANOTUBE FILM," filed on Nov. 23, 2010, and application Ser. No. 12/952,402 [now U.S. Pat. No. 8,431,066]; and "CARBON NANOTUBE ARRAY STRUCTURE AND METHOD FOR MAKING THE SAME", filed on Oct. 29, 2010, and application Ser. No. 12/915,263.

BACKGROUND

1. Technical Field

The present disclosure relates to a method for making carbon nanotube film.

2. Description of Related Art

Carbon nanotubes are hollow tubular structures having excellent mechanical, thermal, and electrical properties. Their unique properties make carbon nanotubes ideal candidates for potential applications in different fields. However, the carbon nanotubes with a nanoscale dimension are difficult to process. Attempts to fabricate a carbon nanotube structure with a macroscale dimension for easy processing include fabricating the carbon nanotube structure into wire shapes, film shapes, or other macroscopic shapes.

Recently, a carbon nanotube film has been fabricated by pressing a carbon nanotube array using a pressing device disclosed by U.S. Pat. No. 7,641,885 B2 to Liu et al. The carbon nanotube film is a free-standing structure and includes a plurality of carbon nanotubes attracted to each other by van der Waals attractive force therebetween. Thus, the carbon nanotube film has good mechanical properties.

However, the size of the carbon nanotube film formed by directly pressing the carbon nanotube array is restricted by the size of the carbon nanotube array. During the growth of the carbon nanotube array using a CVD method, the inner gas pressure of the tube furnace is less than the atmospheric pressure outside the tube furnace. Therefore, the sidewall of the tube furnace must bear an inward pressure difference applied thereon.

If the tube furnace with a diameter of about 10 inches and a length of about 2 meters has the inner gas pressure of about 10 torrs, the pressure difference between the inside and the outside of the tube furnace is about 50,000 Newton. However, if the diameter of the tube furnace is increased to 40 inches, the pressure difference could reach about 200,000 Newton. Further, as the diameter of the tube furnace increases, the curvature of the sidewall of the tube furnace decreases, thus weakening the support of the sidewall and potentially causing damage to the tube furnace.

Accordingly, the tube furnace with a larger diameter can not be achieved. The conventional tube furnace for growing the carbon nanotube array has a diameter of about 10 inches. Therefore, a substrate disposed inside the tube furnace should have a diameter less than 10 inches, such as 8-inches. An original carbon nanotube film formed by directly pressing the carbon nanotube array grown on the 8-inch substrate has a diameter restricted to at most 8 inches.

What is needed, therefore, is to provide a method for making a carbon nanotube film having a relatively large size.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
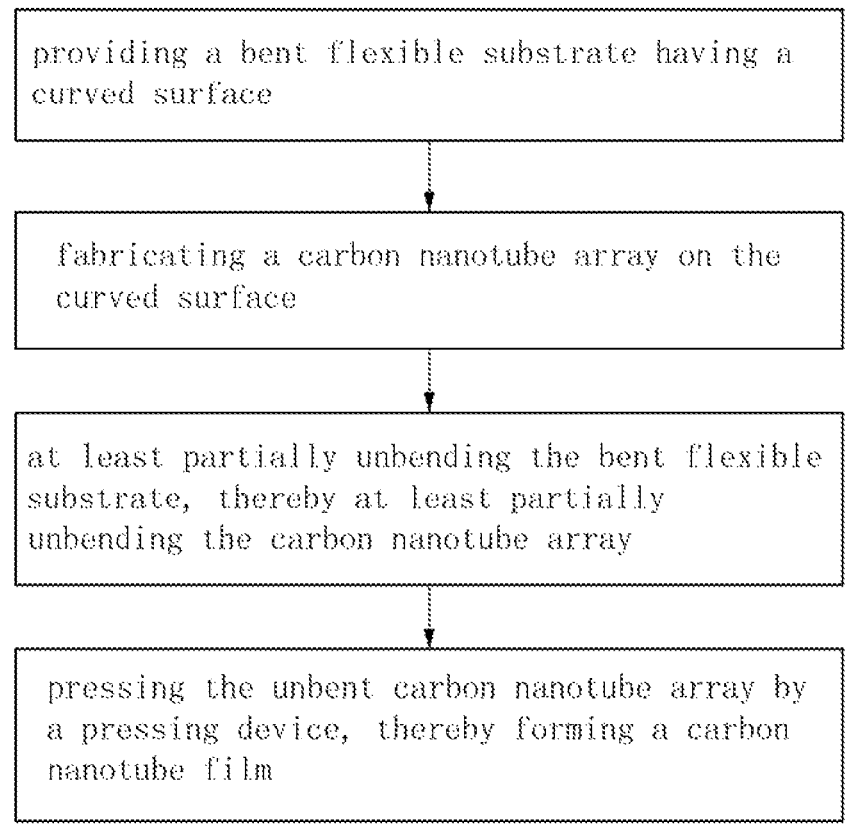
FIG. 1 is a flow chart of an embodiment of a method for making a carbon nanotube film.
Figure 2:
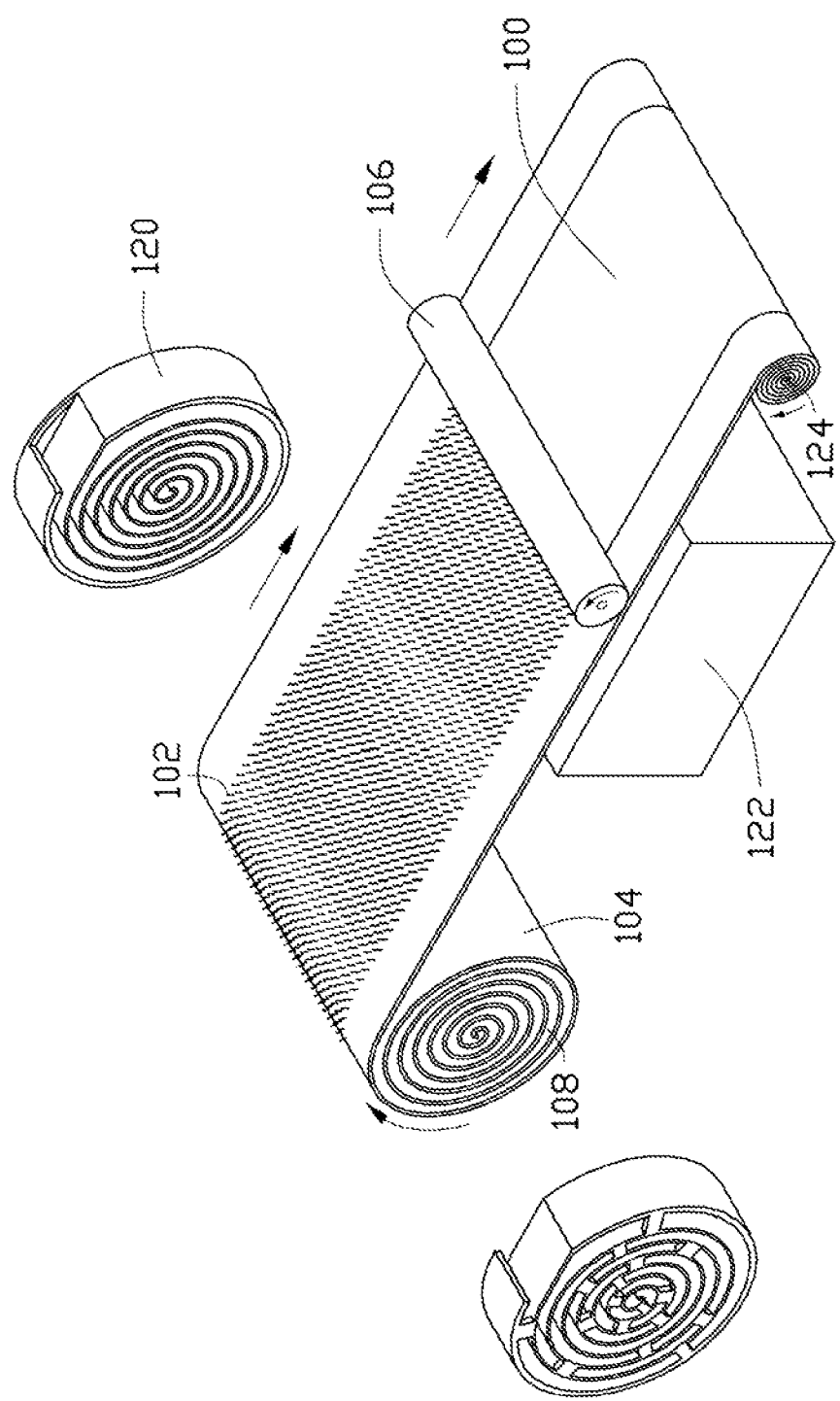
FIG. 2 is a schematic view of the method of FIG. 1.
Figure 3:
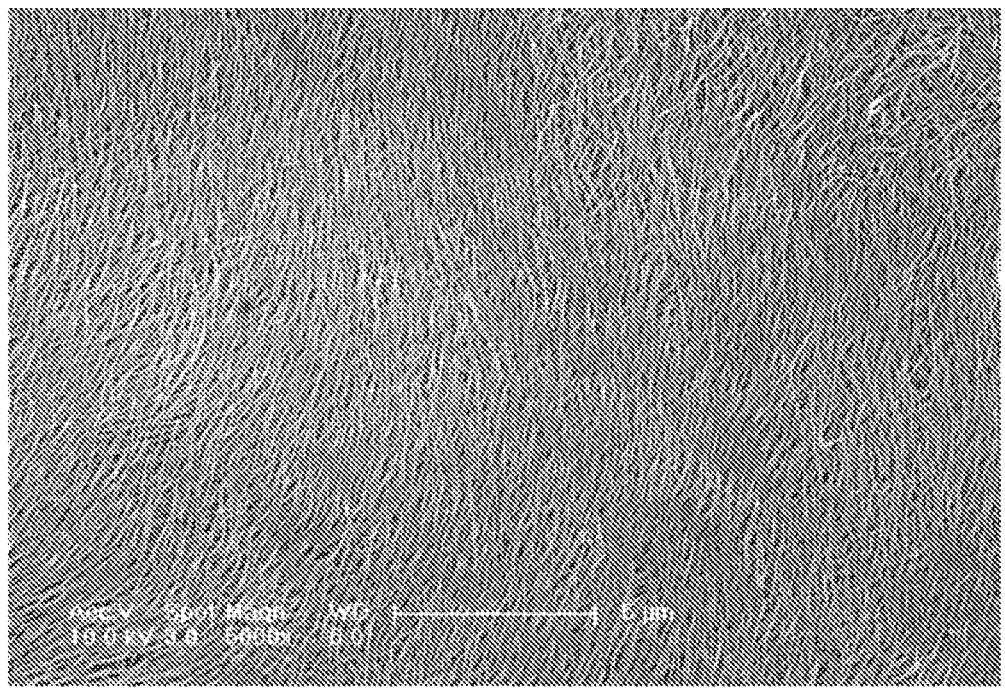
FIG. 3 is a Scanning Electron Microscope (SEM) image of the carbon nanotube film.

Referring to FIGS. 1 and 2, an embodiment of a method for making a carbon nanotube film includes steps of:

S0, providing a bent flexible substrate 104 having a curved surface; S1, fabricating a carbon nanotube array 102 on the curved surface;

S2, at least partially unbending the bent flexible substrate 104, thereby at least partially unbending the carbon nanotube array 102; and S3, pressing the unbent carbon nanotube array 102 by a pressing device 106, thereby forming a carbon nanotube film 100.

In step S1, the carbon nanotube array 102 can be grown on the curved surface of the bent flexible substrate 104 by using a chemical vapor deposition (CVD) method.

In one embodiment, the carbon nanotube array 102 is a super aligned carbon nanotube array. The method for making the super aligned carbon nanotube array includes sub-steps of:

S11, applying a catalyst layer on at least one curved surface;

S12, heating the bent flexible substrate 104 with the catalyst layer at a temperature in an approximate range from about 500° C. to about 900° C. (e.g. 740° C.) in a furnace with a protective gas therein; and S13, supplying a carbon source gas into the furnace for about 5 minutes to about 30 minutes and growing the super-aligned carbon nanotube array on the at least one curved surface of the flexible substrate 104.

In step S11, the flexible substrate 104 can be made of a heat-resistant material, has a planar shape, and can be bent to support the carbon nanotube array 102.

The flexible substrate 104 can endure the temperature for growing the carbon nanotube array 102. A melting point of the flexible substrate 104 is greater than a growing temperature of the carbon nanotube array 102. In one embodiment, the melting point of the flexible substrate 104 is greater than about 500° C. The flexible substrate 104 has a small thickness and has a sheet shape. Specifically, the material of the flexible substrate 104 can be metal, quartz, silicon, ceramic, or any combination thereof, wherein the metal can be molybdenum (Mo), titanium (Ti), zirconium (Zr), columbium (Nb), tantalum (Ta), hafnium (Hf), tungsten (W), vanadium (V), stainless steel, or any alloy thereof. Furthermore, a thickness of the flexible substrate 104 can be set to ensure that the flexible substrate 104 can be bent without fracture. The smaller the thickness of the flexible substrate 104, the more the flexible substrate 104 can be bent. If the flexible substrate 104 is made of metal or alloy, the thickness of the flexible substrate 104 can be less than or equal to 3 millimeters (mm) and greater than or equal to 0.005 mm. If the flexible substrate 104 is made of silicon, quartz, or ceramic, the thickness of the flexible substrate 104 can be less than or equal to 0.3 mm (e.g., less than or equal to 0.1 mm and greater than or equal to 1 micrometer (μm)). In one embodiment, the flexible substrate 104 is a quartz slice with a thickness of about 50 μm, and has at least one smooth curved surface.

The flexible substrate 104 is flexible and can be bent into different shapes such as a tubular shape, a helix shape, or a "U" shape. Specifically, the at least one curved surface of the bent flexible substrate 104 can be a surface generated by a straight line with a certain length intersecting and moving along a curve, i.e., the directrix, while remaining substantially parallel to a fixed straight line that is not on or parallel to the plane of the directrix. For example, if the directrix is round, the curved surface is a cylindrical surface, and if the directrix is a helical line, the curved surface is a helical surface. In one embodiment, the curved surface is a helical surface, namely, the flexible substrate 104 is bent into a helical shape. The helical shaped flexible substrate 104 defines a helical shaped space 108. A width of the space 108 should be larger than a height of the carbon nanotube array 102.

In addition, the catalyst layer can be formed on the flexible substrate 104 before or after bending the flexible substrate 104. A material of the catalyst layer can be iron (Fe), cobalt (Co), nickel (Ni), or any alloy thereof. The catalyst layer can be formed by thermochemical deposition, electron beam deposition, magnetron sputtering, or evaporation. The thickness of the catalyst layer is determined by actual needs and can be in a range from about 1 nanometer (nm) to about 50 nm. The catalyst layer can be formed on two opposite surfaces of the flexible substrate 104 for forming two carbon nanotube arrays 102 thereon. In one embodiment, the catalyst layer is formed on a surface of the flexible substrate 104, and the catalyst layer is a Fe layer with a thickness of about 5 nm.

Furthermore, the flexible substrate 104 with the catalyst layer is annealed at a temperature in a range from about 300° C. to about 900° C. (e.g., 700° C.) in air for about 30 minutes to about 90 minutes.

In step S12, when the furnace is a quartz tube furnace and the flexible substrate 104 is bent into a tubular shape or a helical shape, the bent flexible substrate 104 can be disposed in the tube furnace with the axis of the flexible substrate 104 substantially parallel to the axis of the tube furnace. Furthermore, a bracket can be used to fix the bent shape of the flexible substrate 104 and support the bent flexible substrate 104, thereby suspending the bent flexible substrate 104 in the furnace. The structure of the bracket is not limited and should avoid obstructing the heat or the carbon source gas transmitted to the catalyst layer, so as to not influence the growth of the carbon nanotube array 102. The protective gas can be at least one of nitrogen ($N_2$), ammonia ($NH_3$), and a noble gas.

In step S13, the carbon source gas can be a hydrocarbon gas, such as ethylene ($C_2H_4$), methane ($CH_4$), acetylene ($C_2H_2$), ethane ($C_2H_6$), or any combination thereof. In one embodiment, the carbon nanotube array 102 includes a plurality of carbon nanotubes aligned along a direction substantially perpendicular to the curved surface of the flexible substrate 104. The carbon nanotubes are substantially straight. When the flexible substrate 104 is unbent to a flat shape, the carbon nanotubes are substantially parallel to each other, and perpendicular to the unbent surface of the flexible substrate 104. The carbon nanotubes being substantially parallel to each other means that a large number of carbon nanotubes are arranged substantially along the same direction, and a small number of the carbon nanotubes may be randomly arranged, and has a small if not negligible effect on the larger number of the carbon nanotubes. In addition, the carbon nanotubes do not need to be exactly perpendicular to the surface of the flexible substrate 104, but substantially perpendicular. The carbon nanotube array 102 is substantially pure, and a van der Waals attractive force exists between the carbon nanotubes in the carbon nanotube array 102. In another embodiment, the carbon nanotubes in the carbon nanotube array 102 can be disorderly aligned, the carbon nanotubes in the carbon nanotube array 102 has a large distribution density with van der Waals attractive force between the carbon nanotubes, and the carbon nanotubes can be curled.

It is difficult to process step S3 if the flexible substrate 104 is bent. Thus, after being removed from the furnace, the carbon nanotube array 102 grown on the bent flexible substrate 104 is first unbent in step S2 before step S3.

In step S2, the flexible substrate 104 is unbent to form the carbon nanotube film 100. In one embodiment, the flexible substrate 104 is unbent into a flat shape, and correspondingly, the carbon nanotube array 102 is unbent into a flat shape.

In step S3, the pressing device 106 can be a pressure head such as a pressing roller or plate. The pressure head has at least one surface used to contact and press the carbon nanotube array 102. In one embodiment, the pressure head has a smooth surface. The surface of the pressure head can be a flat surface or a cylindrical surface. If the surface of the pressure head is a flat surface, the pressure head can apply a pressure on the carbon nanotube array 102 along a direction substantially perpendicular to the surface of the unbent flexible substrate 104. Accordingly, the carbon nanotubes in the carbon nanotube array 102 are slanted along different directions, thereby forming an isotropic carbon nanotube film 100 including a plurality of carbon nanotubes aligned along different directions. If the surface of the pressure head is a cylindrical surface, the pressure head can be continuously rolled along a direction on the unbent carbon nanotube array 102, thereby pressing the carbon nanotube array 102 along the same direction. Accordingly, the carbon nanotubes in the carbon nanotube array 102 are slanted along the same direction, thereby forming an anisotropic carbon nanotube film 100 including a plurality of carbon nanotubes aligned along the same direction.

The steps S2 and S3 can be executed simultaneously. First, the flexible substrate 104 is partially unbent, thereby partially unbending the carbon nanotube array 102. Second, the partially unbent carbon nanotube array 102 is pressed using the pressing device 106. Third, the bent flexible substrate 104 on which the carbon nanotube array 102 is not pressed is continuously unbent during the pressing of the carbon nanotube array 102, thereby continuously supplying the unbent carbon nanotube array 102 and continuously pressing the unbent carbon nanotube array 102 to continuously form the carbon nanotube film 100.

In another embodiment, the steps S2 and S3 can be separately executed. First, the flexible substrate 104 is entirely unbent, thereby entirely unbending the carbon nanotube array 102. Next, the unbent carbon nanotube array 102 is continuously pressed by the pressing device, thereby forming the carbon nanotube film 100.

In one embodiment, the steps S2 and S3 are executed simultaneously. The executing process includes the following steps of:

(a) providing a fixing device, an unbending tool, and a support 122, fixing one end of the flexible substrate 104 by using the fixing device, and disposing the support 122 at one side of the flexible substrate 104;

(b) clamping a free end of the flexible substrate 104 using the unbending tool, and drawing the flexible substrate 104 toward to the support 122, thereby partially unbending the flexible substrate 104 to partially unbend the carbon nanotube array 102;

(c) disposing the unbent flexible substrate 104 on the support 122; and (d) pressing the unbent carbon nanotube array 102 on the unbent flexible substrate 104 disposed on the support 122 by using the pressure head.

In step (a), the fixing device includes two opposite groove fixtures 120 defining at least one groove, and a fixing bracket for supporting and fixing the two groove fixtures 120. The two groove fixtures 120 are spaced from each other. The shape of each of the two groove fixtures 120 is not limited and can be set according to the shape of the bent flexible substrate 104. Specifically, the shape of the cross section of the groove fixture 120 is similar to the shape of the cross section of the bent flexible substrate 104. In one embodiment, the cross section of the bent flexible substrate 104 is helical in shape. Correspondingly, the groove fixtures 120 defines a helical groove that accommodates the end of the helical shaped flexible substrate 104. Specifically, two ends of the flexible substrate 104 along an axis of the flexible substrate 104 are movably disposed in the helical grooves of the groove fixture 120. Accordingly, the two ends of the flexible substrate 104 are fixed in the two groove fixtures 120, and the middle portion of the flexible substrate 104 is suspended.

In step (b), the flexible substrate 104 is gradually pulled out from the groove fixtures 120 along the helical path of the helical groove by the unbending tool. Accordingly, the flexible substrate 104 and the carbon nanotube array 102 grown on the flexible substrate 104 is unbent.

In step (d), during unbending the flexible substrate 104, the carbon nanotube film 100 is continuously formed by pressing the unbent carbon nanotube array 102 using the pressing device 106. Namely, the flexible substrate 104 is continuously or discontinuously unbent into a flat shape, thereby continuously or discontinuously supplying the unbent carbon nanotube array 102. Accordingly, the pressing device 106, thereby gradually forming the carbon nanotube film 100 having a large area, continuously or discontinuously presses the unbent carbon nanotube array 102.

The carbon nanotube array 102 is discontinuously pressed using the pressing device 106 by the steps of: (1) discontinuously and partially unbending the flexible substrate 104, thereby discontinuously and partially unbending the carbon nanotube array 102; and (2) discontinuously pressing the unbent carbon nanotube array 102 using the pressing device, thereby forming the carbon nanotube film 100.

In step (1), the flexible substrate 104 is partially unbent, after which the unbending process of the flexible substrate 104 is stopped, and the pressing device 106 begins to press the unbent carbon nanotube array 102. Accordingly, the carbon nanotubes in the carbon nanotube array 102 are slanted under pressure, and the carbon nanotube film 100 is formed. Sequentially, the pressing device 106 stops pressing the carbon nanotube array 102, and the bent flexible substrate 104 is further unbent to continuously supply the unbent carbon nanotube array 102.

In step (2), if the pressing device 106 is the pressure head having a flat surface, the width of the flat surface of the pressure head can be greater than the width of the carbon nanotube array 102. After the carbon nanotubes in the unbent carbon nanotube array 102 is slanted under pressure, the pressure head is hoisted along a direction substantially perpendicular to the support 122, and the bent flexible substrate 102 is successively unbent to supply the unbent carbon nanotube array 102 disposed on the support 122. Sequentially, the pressure head is moved forward the unbent carbon nanotube array 102 to press the unbent carbon nanotube array 102 along a direction substantially perpendicular to the support 122. The pressure head is repeatedly hoisted and pressed, and intermittently presses the unbent carbon nanotube array 102 disposed on the support 122, thereby forming the carbon nanotube film 100. In addition, if the pressing device is the pressure head having a cylindrical surface, the pressure head can roll along a direction or different directions on unbent carbon nanotube array 102, thereby pressing the carbon nanotubes in the carbon nanotube array 102 along a direction or different directions.

The unbent carbon nanotube array 102 is continuously pressed by using the pressing device 106 by the steps of: (I) continuously unbending the flexible substrate 104, thereby continuously unbending the carbon nanotube array 102; and (II) continuously pressing the unbent carbon nanotube array 102 by using the pressing device 106.

In above step (II), the pressing device 106 can be the pressure head having a cylindrical surface. First, the unbent carbon nanotube array 102 is contacted by the cylindrical surface of the pressure head, and an axis direction of the cylindrical surface is the same as the width direction of the flexible substrate 104. Second, the pressure head is continuously rolled to continuously press the unbent carbon nanotube array 102, thus the carbon nanotubes in the carbon nanotube array 102 are gradually slanted under pressure thereby forming the carbon nanotube film 100. In one embodiment, the pressure head is rolled along a direction opposite to the unbending direction of the flexible substrate 104 to press the carbon nanotube array 102. Thus, the carbon nanotubes in the carbon nanotube array 102 are slanted along the same direction. A rolling speed of the pressure head can be smaller than or equal to the unbending speed of the flexible substrate 104. Accordingly, the process of pressing the carbon nanotube array 102 and the process of unbending the bent carbon nanotube array 102 can be executed simultaneously.

In addition, the support 122 can have a curved surface, for example, the support 122 has a cylindrical surface similar to the surface of the pressing device 106. The flexible substrate 104 can be clamped between the support 122 and the pressing device 106. If the carbon nanotube array 102 is grown on the two opposite surface of the flexible substrate 102, the support 122 can be replaced by another pressing device 106, and the two pressing devices 106 can simultaneously press the carbon nanotube array 102. Specifically, the two pressing devices 106 can be rolled simultaneously along a same direction to press the carbon nanotube arrays 102 on the two opposite surfaces of the flexible substrate 102. Thus, two carbon nanotube films 100 are formed on two opposite surfaces of the flexible substrate 102.

Furthermore, the carbon nanotube film 100 having a great area is gradually formed with the unbending of the flexible substrate 104. The used flexible substrate 104 can be wound on a reel 124 for saving the occupied space of the unbent flexible substrate 104. Specifically, the used flexible substrate 104 is gradually wound on the reel 124 along with a rotation of the reel 124. Meanwhile, the bent flexible substrate 104 without the carbon nanotube film 100 is gradually unbent. In addition, if the carbon nanotube film 100 is only formed on a surface of the flexible substrate 104. The other surface opposite to the surface with the carbon nanotube film 100 of the flexible substrate 104 can be further coated by silicon, paraffin, or Teflon, so that the carbon nanotube film 100 can avoid being adhered to another surface of the flexible substrate 106.

In addition, a small adhesive strength exists between the carbon nanotube film 100 and the flexible substrate 104, and the carbon nanotubes in the carbon nanotube film 100 are attracted to each other by van der Waals attractive force therebetween. Thus, the carbon nanotube film 100 can peel easily off from the flexible substrate 104 without destruction, and can sustain a free-standing structure.

The area of the bent flexible substrate 104 may be large. When the bent flexible substrate 104 is unbent into a flat shape, the flat flexible substrate 104 will take up a large space. Thus, the processes of unbending the flexible substrate 104, pressing the carbon nanotube array 102, and reeling the flexible substrate 104 with the carbon nanotube film 100 simultaneously can save space during formation of the carbon nanotube film 100, and only a portion of the flexible substrate 104 will be unbent during the entire pressing process.

The carbon nanotube film 100 includes a plurality of carbon nanotubes oriented along a preferred orientation or different preferred orientations.

A large number of the carbon nanotubes in the carbon nanotube film 100 can be oriented along a preferred orientation, meaning that a large number of the carbon nanotubes in the carbon nanotube film 100 are arranged substantially along the same direction and parallel to the surface of the carbon nanotube film 100. A small number of the carbon nanotubes are randomly arranged in the carbon nanotube film 100, and has a small if not negligible effect on the larger number of the carbon nanotubes in the carbon nanotube film 100 arranged substantially along the same direction. The carbon nanotubes in the carbon nanotube film 100 can be oriented along different preferred orientations, meaning that parts of the carbon nanotubes in the carbon nanotube film 100 are arranged substantially along the same direction, and other parts of the carbon nanotubes are arranged along other directions. The carbon nanotubes in the carbon nanotube film 100 overlap each other and are attracted to each other by van der Waals attractive force. Thus, the carbon nanotube film 100 has a free-standing structure, has good flexibility, and can be bent into different shapes without fracture. The term "free-standing structure" means that the carbon nanotube film 100 can sustain the weight of itself when it is hoisted by a portion thereof without any significant damage to its structural integrity. So, if the carbon nanotube film 100 is placed between two separate supports, a portion of the carbon nanotube film 100 not in contact with the two supports would be suspended between the two supports and yet maintain film structural integrity. The free-standing structure is different from a powder which would collapse if the powder is not in contact with the two supports. The free-standing structure of the carbon nanotube film 100 is realized by the successive carbon nanotubes attracted to each other by van der Waals attractive force.

In addition, an angle $\alpha$ is existed between the carbon nanotubes in the carbon nanotube film 100 and the surface of the flexible substrate 104 with the carbon nanotube film 100. The angle $\alpha$ is greater than or equal to about 0 degrees and less than or equal to about 15 degrees. The angle $\alpha$ is related to the pressure applied on the carbon nanotube array 102. The greater the pressure, the less the angle $\alpha$. The thickness of the carbon nanotube film 100 is related to the height of the carbon nanotube array 102 and the pressure applied on the carbon nanotube array 102. The larger the height of the carbon nanotube array 102, the smaller the pressure, and the thicker the thickness of the carbon nanotube film 100, and vice versa. In one embodiment, the thickness of the carbon nanotube film 100 ranges from about 1 micrometer to about 1 millimeter.

Compared with the conventional rigid substrate, the flexible substrate 104 can be bent into a certain shape to accommodate the space of the reaction furnace. Accordingly, the carbon nanotube array 102 having a large area can be grown on the bent flexible substrate 104, and the carbon nanotube film 100 having a large area can be formed. In addition, the flexible substrate 104 can be unbent into a flat shape correspondingly, the carbon nanotube array 102 grown on the flexible substrate 104 can also be unbent into a flat shape. Thus, the carbon nanotube film 100 can be easily formed by pressing the flat carbon nanotube array 102.

Depending on the embodiment, certain steps of the methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a carbon nanotube film, comprising:
   providing a bent flexible substrate having a curved surface;
   fabricating a carbon nanotube array on the curved surface, wherein the carbon nanotube array comprises a plurality of carbon nanotubes aligned along a direction substantially perpendicular to the curved surface of the flexible substrate;
   at least partially unbending the bent flexible substrate, thereby at least partially unbending the carbon nanotube array;
   pressing the unbent carbon nanotube array with a pressing device to slant the carbon nanotubes in the unbent carbon nanotube array, thereby forming the carbon nanotube film.

2. The method as claimed in claim 1, wherein before pressing the carbon nanotube array, the flexible substrate is entirely unbent into a flat shape.

3. The method as claimed in claim 1, wherein before pressing the carbon nanotube array, the flexible substrate is partially unbent into a flat shape.

4. The method as claimed in claim 3, wherein during pressing the unbent carbon nanotube array, the bent flexible substrate is continuously unbent into the flat shape, thereby continuously providing the unbent carbon nanotube array, and the carbon nanotube film is continuously formed by pressing the unbent carbon nanotube array.

5. The method as claimed in claim 4, wherein two ends of the bent flexible substrate are movably disposed into two groove fixtures before unbending the bent flexible substrate.

6. The method as claimed in claim 5, wherein an unbending tool is further provided to clamp and draw a free end of the bent flexible substrate, thereby drawing out and unbending the flexible substrate from the groove fixtures.

7. The method as claimed in claim 1, wherein after the carbon nanotube film is formed on the unbent flexible substrate, the unbent flexible substrate is further rolled up.

8. The method as claimed in claim 1, wherein the carbon nanotube array is discontinuously pressed using the pressing device by the steps of:
   discontinuously unbending the bent flexible substrate, thereby discontinuously supplying the unbent the carbon nanotube array;
   discontinuously pressing the unbent carbon nanotube array using the pressing device.

9. The method as claimed in claim 8, wherein the step of unbending of the flexible substrate is stopped when the pressing device presses the carbon nanotube array.

10. The method as claimed in claim 1, wherein the pressure device has a flat surface used to contact and press the carbon nanotube array, and the pressure device presses the carbon nanotube array along a direction substantially perpendicular to an unbent surface of the flexible substrate.

11. The method as claimed in claim 10, wherein after the carbon nanotube film is formed on the unbent flexible substrate, the pressure device is hoisted and the bent flexible substrate is successively unbent to supply the unbent carbon nanotube array disposed below the pressure device.

12. The method as claimed in claim 1, wherein the pressure device has a cylindrical surface, and the pressure device is rolled on the unbent carbon nanotube array along a direction.

13. The method as claimed in claim 1, wherein the steps of unbending the bent flexible substrate and pressing the unbent carbon nanotube array include the substeps of:
   continuously unbending the bent flexible substrate, thereby continuously unbending the carbon nanotube array;
   contacting the unbent carbon nanotube array using the pressing device, wherein the pressing device is a pressure head having a cylindrical surface, and an axis direction of the cylindrical surface of the pressure head is substantially the same as the width direction of the flexible substrate; and
   continuously rolling the pressure head on the unbent carbon nanotube array, thereby continuously pressing the carbon nanotube array.

14. The method as claimed in claim 13, wherein carbon nanotubes in the carbon nanotube array are slanted along a rolling direction of the pressure head.

15. The method as claimed in claim 1, wherein the curved surface is generated by a straight line with a certain length intersecting and moving along a plane curve.

16. The method as claimed in claim 15, wherein the curved surface comprises a tubular shaped surface or a helical shaped surface.

17. The method as claimed in claim 1, wherein the carbon nanotube film is peeled off from the flexible substrate.

18. The method as claimed in claim 1, wherein the flexible substrate is a metal slice, and a thickness of the flexible substrate is smaller than or equal to about 3 mm.

19. The method as claimed in claim 1, wherein the flexible substrate is a quartz slice, a silicon slice, or a ceramic slice, and a thickness of the flexible substrate is smaller than or equal to about 0.3 mm.

20. A method for making a carbon nanotube film, comprising:
   providing a bent flexible substrate having a curved surface;
   forming a catalyst layer on the curved surface;
   fabricating a carbon nanotube array on the catalyst layer, the carbon nanotube array comprising a plurality of carbon nanotubes;
   at least partially unbending the bent flexible substrate, thereby at least partially unbending the carbon nanotube array;
   pressing the unbent carbon nanotube array with a pressing device to slant the carbon nanotubes of the unbent carbon nanotube array, thereby forming the carbon nanotube film.

* * * * *